(12) United States Patent
Yamauchi et al.

(10) Patent No.: US 8,072,659 B2
(45) Date of Patent: Dec. 6, 2011

(54) COLOR PROCESSOR, COMPUTER READABLE MEDIUM AND COLOR PROCESSING METHOD

(75) Inventors: Yasuki Yamauchi, Ashigarakami-gun (JP); Akihiro Ito, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 623 days.

(21) Appl. No.: 12/196,111

(22) Filed: Aug. 21, 2008

(65) Prior Publication Data

US 2009/0231646 A1   Sep. 17, 2009

(30) Foreign Application Priority Data

Mar. 14, 2008 (JP) ................................. 2008-066632

(51) Int. Cl.
*G03F 3/08* (2006.01)
*H04N 1/60* (2006.01)
*G06K 9/00* (2006.01)

(52) U.S. Cl. ......... 358/520; 358/1.9; 358/523; 382/164; 382/167

(58) Field of Classification Search .................. 358/523, 358/524, 518, 520, 504, 525, 1.2, 1.13, 530; 382/167, 162, 286, 300, 305, 164, 165
See application file for complete search history.

(56) References Cited

U.S. PATENT DOCUMENTS

| | | | | |
|---|---|---|---|---|
| 5,963,201 A | * | 10/1999 | McGreggor et al. | 715/722 |
| 6,128,022 A | * | 10/2000 | Dillinger | 345/591 |
| 6,160,644 A | | 12/2000 | Lin | |
| 6,373,595 B1 | * | 4/2002 | Semba et al. | 358/1.9 |
| 7,103,216 B2 | | 9/2006 | Okamoto | |
| 7,230,737 B1 | * | 6/2007 | Ohga | 358/1.9 |
| 2003/0001860 A1 | * | 1/2003 | Yamazaki et al. | 345/590 |
| 2005/0248785 A1 | * | 11/2005 | Henley et al. | 358/1.9 |
| 2007/0236759 A1 | * | 10/2007 | Ohga | 358/518 |
| 2008/0239410 A1 | * | 10/2008 | Hashii et al. | 358/462 |

FOREIGN PATENT DOCUMENTS

| | | |
|---|---|---|
| EP | 0 626 781 A2 | 11/1994 |
| JP | A-08-149320 | 6/1996 |
| JP | A-2002-27272 | 1/2002 |
| JP | A-2002-27272 | 2/2002 |
| JP | A-2002-232732 | 8/2002 |
| JP | A-2006-215808 | 8/2006 |

OTHER PUBLICATIONS

Australian Office Action issued in Australian Patent Application No. 2008212017, on Nov. 27, 2009.
Translation of Jan. 26, 2010 Office Action issued in Japanese Patent Application No. 2008-066632.

* cited by examiner

*Primary Examiner* — Madelein A Nguyen
(74) *Attorney, Agent, or Firm* — Oliff & Berridge, PLC

(57) ABSTRACT

The color processor is provided with: a conversion source color data acquiring part for acquiring conversion source color datasets in a first color space; a gamut storage for storing a gamut; a determining part for determining whether or not each of the conversion source color datasets exists in the gamut; a first color conversion processor for performing color conversion processing on each of conversion source color datasets A in the conversion source color datasets by use of a color conversion characteristic model, the conversion source color datasets A being determined to exist in the gamut; and a second color conversion processor for performing color conversion processing on each of conversion source color datasets B in the conversion source color datasets by use of color conversion correspondence, the conversion source color datasets B being determined not to exist in the gamut.

11 Claims, 9 Drawing Sheets

US 8,072,659 B2

COLOR PROCESSOR, COMPUTER READABLE MEDIUM AND COLOR PROCESSING METHOD

CROSS REFERENCE TO RELATED APPLICATIONS

This application is based on and claims priority under 35 USC §119 from Japanese Patent Application No. 2008-066632 filed Mar. 14, 2008.

BACKGROUND

1. Technical Field

The present invention relates to a color processor, a computer readable medium storing a program and a color processing method.

2. Related Art

Each of color image output apparatuses such as color printers and color display devices has its own specific color reproduction range called a gamut. For this reason, the color image output apparatus generally performs gamut compression processing (gamut mapping algorithm) for converting inputted image data into color data within the gamut of the color image output apparatus.

SUMMARY

According to an aspect of the invention, there is provided a color processor including: a conversion source color data acquiring part for acquiring conversion source color datasets in a first color space; a gamut storage for storing a gamut; a determining part for determining whether or not each of the conversion source color datasets acquired by the conversion source color data acquiring part exists in the gamut stored in the gamut storage; a first color conversion processor for performing color conversion processing on each of conversion source color datasets A included in the conversion source color datasets by use of a color conversion characteristic model that defines correspondence between colors in the first color space and colors in a second color space which is a destination for the color conversion processing, the conversion source color datasets A being determined to exist in the gamut by the determining part; and a second color conversion processor for performing color conversion processing on each of conversion source color datasets B included in the conversion source color datasets by use of color conversion correspondence that is obtained by performing the color conversion processing on the conversion source color datasets A by the first color conversion processor, the conversion source color datasets B being determined not to exist in the gamut by the determining part.

BRIEF DESCRIPTION OF THE DRAWINGS

Exemplary embodiment (s) of the present invention will be described in detail based on the following figures, wherein.

DETAILED DESCRIPTION

Hereinafter, with reference to the attached drawings, an exemplary embodiment of the present invention will be described in detail.

Figure 1:
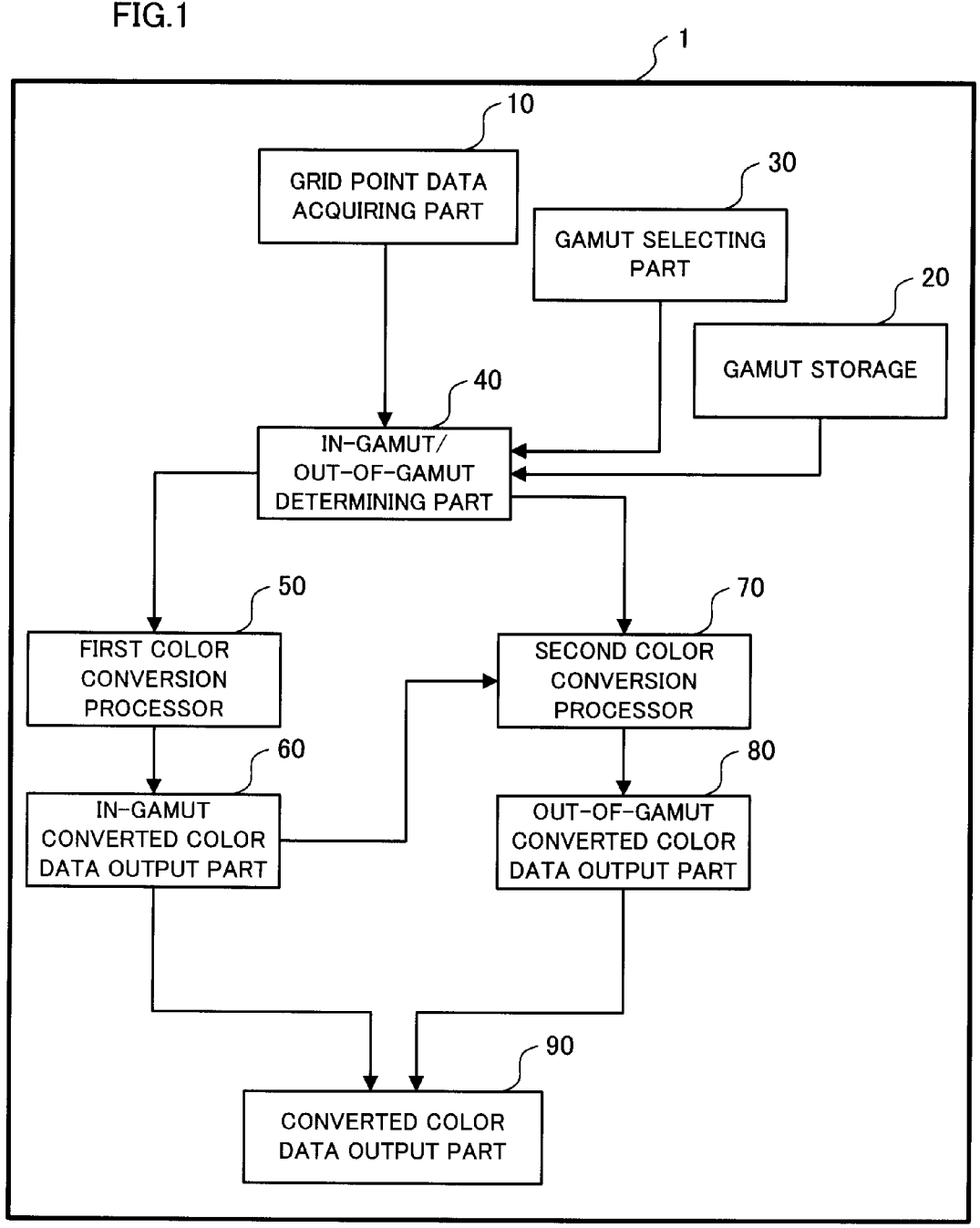
FIG. 1 is a block diagram showing an entire configuration of a color processor to which the exemplary embodiment is applied.

FIG. 1 is a block diagram showing an entire configuration of a color processor 1 to which the exemplary embodiment is applied. The color processor 1 shown in FIG. 1 is provided with: a grid point data acquiring part 10 for acquiring grid point datasets in a device-independent color space, for example, in the $L^*a^*b^*$ color space; a gamut storage 20 for storing multiple types of gamuts (color reproduction ranges); a gamut selecting part 30 for selecting any one of the multiple types of gamuts stored in the gamut storage 20; and an in-gamut/out-of-gamut determining part 40 for determining whether each of the grid point datasets acquired by the grid point data acquiring part 10 exists inside the gamut (including the gamut boundary) selected by the gamut selecting part 30 or out of the gamut.

In addition, the color processor 1 is also provided with a first color conversion processor 50 and an in-gamut converted color data output part 60. The first color conversion processor 50 performs color conversion processing on the grid point datasets determined as existing inside the gamut (including the gamut boundary) by the in-gamut/out-of-gamut determining part 40. In association with the grid point datasets acquired by the grid point data acquiring part 10, the in-gamut converted color data output part 60 outputs the converted color datasets in the gamut (in-gamut converted color datasets) which have been color-converted by the first color conversion processor 50.

Moreover, the color processor 1 is provided with a second color conversion processor 70 and an out-of-gamut converted color data output part 80. The second color conversion processor 70 performs color conversion processing on the grid point datasets determined as existing out of the gamut by the in-gamut/out-of-gamut determining part 40. This color conversion processing is performed on the basis of the in-gamut converted color datasets that are one example of correspondence for color conversion. In association with the grid point datasets acquired by the grid point data acquiring part 10, the out-of-gamut converted color data output part 80 outputs the converted color datasets out of the gamut (out-of-gamut converted color datasets) which have been color-converted by the second color conversion processor 70.

Furthermore, the color processor 1 is provided with a converted color data output part 90 for outputting the in-gamut converted color datasets associated with the grid point datasets from the in-gamut converted color data output part 60, and the out-of-gamut converted color datasets associated with the grid point datasets from the out-of-gamut converted color data output part 80.

The grid point data acquiring part 10 is one example of a conversion source color data acquiring part for acquiring conversion source color datasets to be color-converted, and obtains, as conversion source color datasets, color datasets regularly aligned, for example, in the L*a*b* color space that is a device-independent color space. The color datasets regularly aligned are generally referred to as "grid points." In this description, the color coordinates of each of these grid points are referred to as a "grid point dataset."

For instance, in the three-dimensional L*a*b* color space, the coordinate value of the lightness L* is set to be within a range of 0 to 100, and the coordinate values of chromaticity a* and b* are set to be within a range of −128 to 127. Each of the coordinate axes is partitioned by any certain number of steps (for example, 16 steps), and all combinations of coordinate values on the partitioned coordinate axes are prepared as grid point datasets in the L*a*b* color space.

The grid point data acquiring part 10 acquires, as the grid point datasets, the color coordinates of the grid points in the L*a*b* color space, as described above, for example. Then, the grid point data acquiring part 10 transmits the obtained grid point datasets to the in-gamut/out-of-gamut determining part 40.

Figure 2:
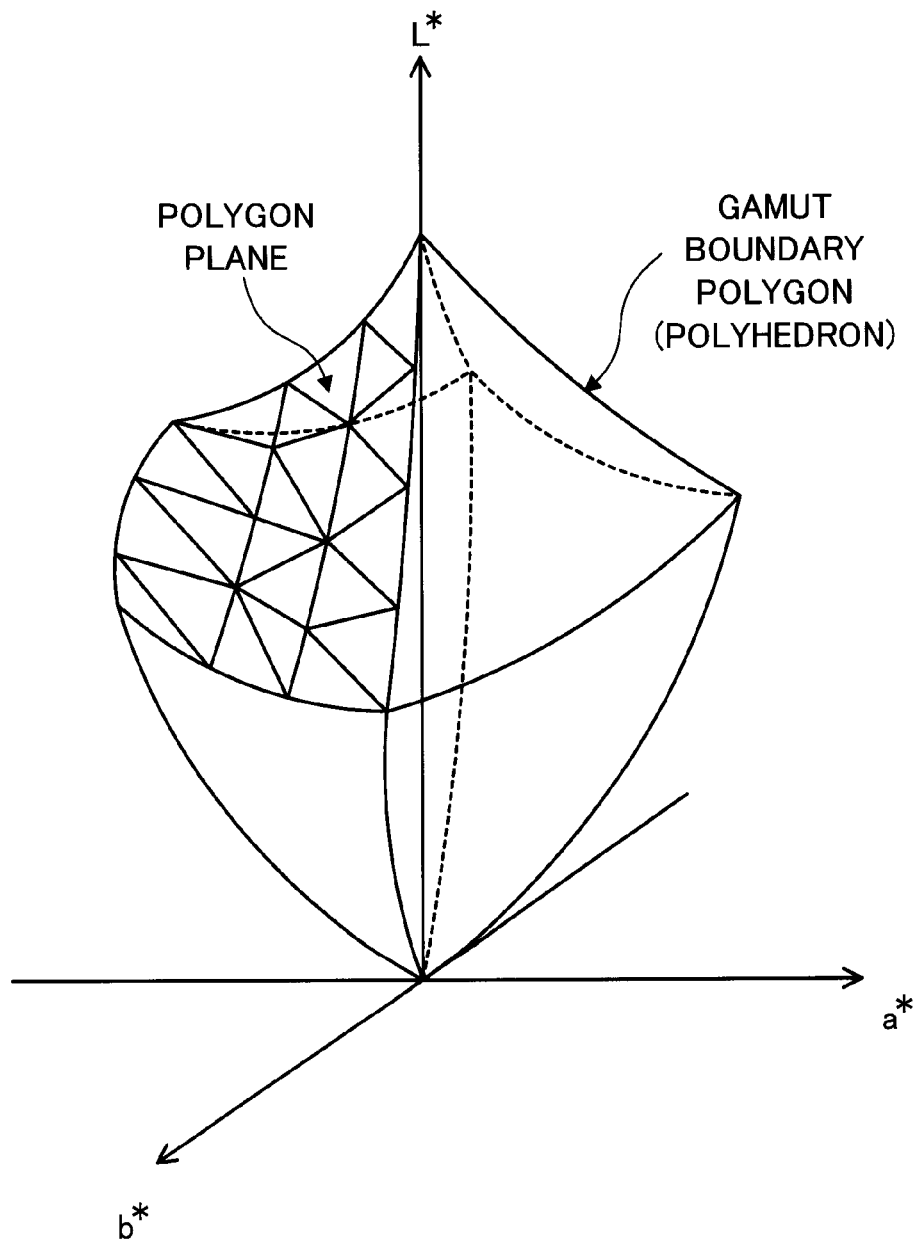
FIG. 2 shows one example of gamut boundary polygons stored in the gamut storage.

The gamut storage 20 is one example of a gamut storage, and stores each of multiple gamuts as a polyhedron (gamut boundary polygons) in the L*a*b* color space. Here, FIG. 2 shows one example of gamut boundary polygons stored in the gamut storage 20. Since the gamut is a region occupying a part of the three-dimensional L*a*b* color space, a polyhedron is usable to express the gamut. To express each of the multiple types of gamuts, the gamut storage 20 forms a space region in a part of the L*a*b* color space by using a polyhedron including a set of polygons (polygon planes) such as triangles as shown in FIG. 2. This polyhedron defines the gamut (color reproduction range) in the L*a*b* color space. Incidentally, FIG. 2 shows a gamut boundary polygon expressing only one of the gamuts for the sake of simplification of the drawing. In addition, FIG. 2 shows that only a partial region of the gamut boundary polygons is expressed as a set of polygon planes, but the entire region thereof is formed of a set of polygon planes.

The gamut storage 20 of the present exemplary embodiment stores, as the multiple types of gamuts, the following three gamuts, for example: a gamut (first gamut) of an image output apparatus (target device) such as a color printer, for example, for which the grid point datasets acquired by the grid point data acquiring part 10 are color-converted; a gamut (second gamut) that includes a region outside the first gamut and is an important region for color reproduction of image data (color data), for example, from an input apparatus (input device) of a display device or the like connected to the image output apparatus; and a gamut (third gamut) of a color reproduction range of a general image output apparatus, for example.

Figure 3:
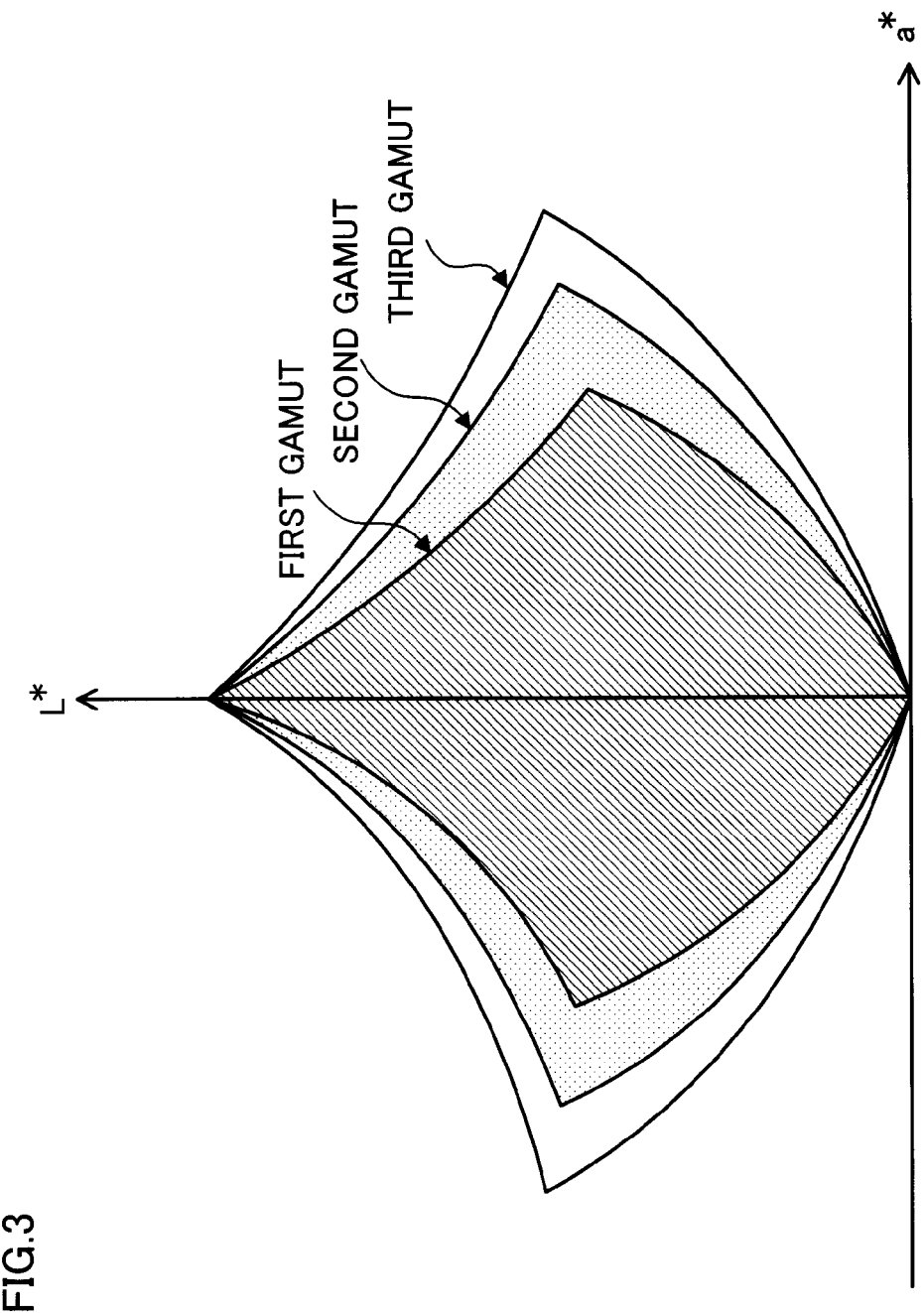
FIG. 3 is a diagram showing the three gamuts stored in the gamut storage.

FIG. 3 is a diagram showing the three gamuts stored in the gamut storage 20. FIG. 3 shows the three gamuts, stored in the gamut storage 20, in the L*a* plane with the setting of the chromaticity b*=0 in the L*a*b* color space. The three gamuts stored in the gamut storage 20 each are a gamut in the L*a*b* color space, which is obtained by previously performing conversion by using a color conversion characteristic model for each device. Such color conversion characteristic model is generated in the same manner as a color conversion characteristic model, for example, which is used to perform the color conversion processing by the first color conversion processor 50 described later.

The gamut selecting part 30 is one example of a gamut selecting part, and selects any one of the multiple types of gamuts, stored in the gamut storage 20, according to an instruction signal from, for example, an operation input part (not shown in the figure) that receives an operation input by a user. Then, the gamut selecting part 30 instructs the gamut storage 20 to transmit information on the selected gamut (gamut information) to the in-gamut/out-of-gamut determining part 40. For example, when the user requires the color conversion processing not only for the color conversion target device, but also for the general image output device to additionally use the general image output device, the third gamut is selected according to the operation input by the user. Otherwise, when the user requires the color conversion processing for the gamut that is important for color reproduction of image data (color data) from the input device, the second gamut is selected according to the operation input by the user. Alternatively, when the user requires only the color conversion processing for the color conversion target device, the first gamut is selected according to the operation input by the user.

Note that, instead of configuring the gamut selecting part 30 to select any one of the multiple types of gamuts according to the operation input by the user, the gamut selecting part 30 may be configured to automatically select any one of the multiple types of gamuts according to the number of grid point datasets acquired by the grid point data acquiring part 10 or the range of the grid point datasets inside the L*a*b* color space, or the like.

The in-gamut/out-of-gamut determining part 40 is one example of a determining part. The in-gamut/out-of-gamut determining part 40 acquires the grid point datasets from the grid point data acquiring part 10, and also acquires the information on the gamut (gamut information) selected by the gamut selecting part 30 from the multiple gamuts stored in the gamut storage 20. Then, the in-gamut/out-of-gamut determining part 40 compares each of the grid point datasets in the L*a*b* color space with the gamut information, and determines whether each of the obtained grid point datasets exists in the gamut boundary polygon (or on the surface of the gamut boundary polygon) of the selected gamut or out of the gamut boundary polygon.

Then, the in-gamut/out-of-gamut determining part 40 transmits the grid point datasets determined as existing in the gamut boundary polygon, to the first color conversion processor 50. In addition, the in-gamut/out-of-gamut determining part 40 transmits the grid point datasets determined as existing out of the gamut boundary polygon, to the second color conversion processor 70.

The first color conversion processor 50 is one example of a first color conversion processor, and generates a color conversion characteristic model. The color conversion characteristic model formulates and defines the correspondence between the color datasets in the L*a*b* color space (first color space) and the color datasets in the CMYK color space (second color space), the correspondence being used to convert the grid point datasets in the L*a*b* color space into the color datasets in the CMYK color space. Thereafter, the first color conversion processor 50 acquires the grid point datasets determined as existing in the gamut, from the in-gamut/out-of-gamut determining part 40, and performs the color conversion processing on the acquired grid point datasets on the basis of the generated color conversion characteristic model.

Figure 4:
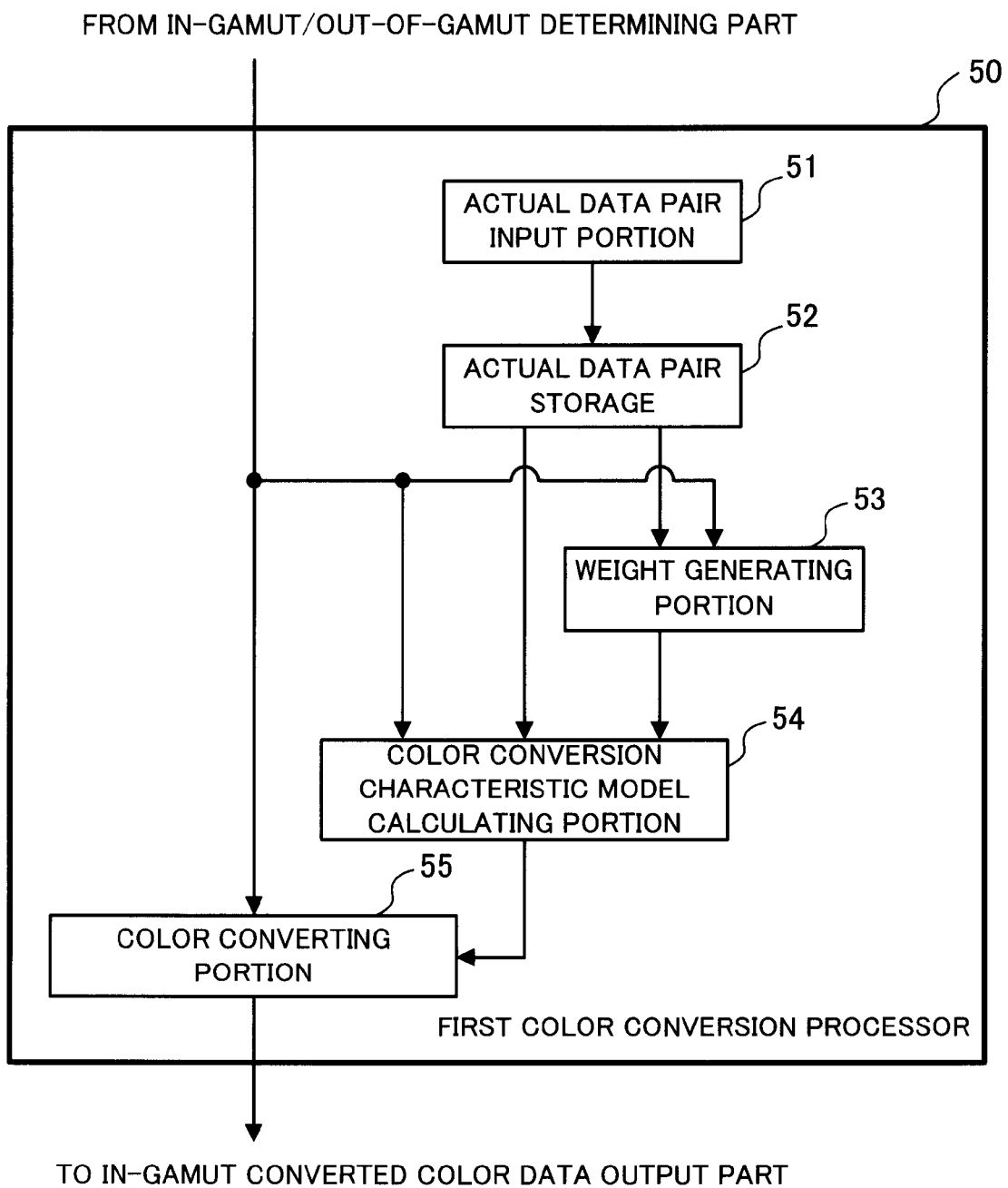
FIG. 4 is a block diagram showing a functional configuration of the first color conversion processor.

FIG. 4 is a block diagram showing a functional configuration of the first color conversion processor 50. The first color conversion processor 50 is provided with an actual data pair input portion 51, an actual data pair storage 52, a weight generating portion 53, a color conversion characteristic model calculating portion 54 and a color converting portion 55.

The actual data pair input portion 51 acquires a pair of color datasets $(x_{1i}, x_{2i}, x_{3i}, x_{4i})$ and $(y_{1i}, y_{2i}, y_{3i})$ as an actual data pair. The color dataset $(x_{1i}, x_{2i}, x_{3i}, x_{4i})$ represents each of color samples (color patches) generated on the basis of various combinations of color coordinate values in the CMYK color space, and the color dataset $(y_{1i}, y_{2i}, y_{3i})$ is obtained by actually measuring (color-measuring) each of the color patches in the L*a*b* color space.

The actual data pair storage 52 stores the actual data pair obtained by the actual data pair input portion 51. Specifically, the actual data pair storage 52 stores n pairs of actual datasets $(x_{1i}, x_{2i}, x_{3i}, x_{4i})$ indicating color patches in the CMYK color space, and actual datasets $(y_{1i}, y_{2i}, y_{3i})$ in the L*a*b* color space corresponding to the respective actual datasets $(x_{1i}, x_{2i}, x_{3i}, x_{4i})$. Here, n and i are integers where i=1 to n.

The weight generating portion 53 generates weight that is to be assigned to the actual datasets when the color conversion characteristic model is calculated through, for example, statistical processing such as regression analysis using the actual datasets.

Through the statistical processing such as regression analysis, the color conversion characteristic model calculating portion 54 calculates the color conversion characteristic model formulating and defining the correspondence between the color datasets in the L*a*b* color space and the color datasets in the CMYK color space (the output color space of the target device). To be more precise, the color conversion characteristic model calculating portion 54 acquires the in-gamut grid point datasets from the in-gamut/out-of-gamut determining part 40, the actual data pairs from the actual data pair storage 52, and the weight from the weight generating portion 53. At this time, the acquired weight to be assigned to a certain actual dataset is set to take a value depending on the distance of the color difference between the certain actual dataset, and a grid point dataset. Then, the color conversion characteristic model calculating portion 54 assigns the weight generated by the weight generating portion 53, to the actual datasets acquired from the actual data pair storage 52, and performs linear regression analysis using the weighted actual datasets Thus, the color conversion characteristic model calculating portion 54 calculates the color conversion characteristic model defining the correspondence between the in-gamut colors (grid point datasets) in the L*a*b* color space and the colors (the converted color datasets) in the CMYK color space corresponding to the colors in the L*a*b* color space. Thereafter, the color conversion characteristic model calculating portion 54 transmits the calculated color conversion characteristic model to the color converting portion 55.

Hereinbelow, descriptions will be provided for the generation of the color conversion characteristic model in the first color conversion processor 50. The first color conversion processor 50 generates the color conversion characteristic model for converting color datasets (L*, a*, b*) in the three-dimensional L*a*b* color space into color datasets (C, M, Y, K) in the four-dimensional CMYK color space.

In the case where the gird point dataset acquired by the grid point data acquiring part 10 is a three-dimensional dataset $(y_{1j}, y_{2j}, y_{3j})$ in the L*a*b* color space (first color space) while the converted color dataset that is to be obtained through the color conversion and outputted by the color converting portion 55 is a four-dimensional dataset $(x_{1j}, x_{2j}, x_{3j}, x_{4j})$ in the CMYK color space (second color space), a calculation is made to solve the following equation (1) including a constant term. In this case, however, the solution of this equation (1) is not uniquely determined due to the lack of a known value because, in the equation (1), a conversion source color to be color-converted is expressed by a three-dimensional grid point dataset $(y_{1j}, y_{2j}, y_{3j})$ whereas a converted color is expressed by a four-dimensional converted color dataset $(x_{1j}, x_{2j}, x_{3j}, x_{4j})$. For this reason, here, the following calculation method is employed: "K" $(=x_{4j})$ in the CMYK color space is calculated in advance by use of the grid point dataset $(y_{1j}, y_{2j}, y_{3j})$; the calculated $(x_{4j})$ is set as a conversion source color; and then the remaining converted color data pieces, for example, $(x_{1j}, x_{2j}, x_{3j})$ are obtained through the calculation of the equation (1). Specifically, the converted color data pieces $(x_{1j}, x_{2j}, x_{3j})$ are obtained by calculating the following equation (2) including a constant term.

$$\begin{pmatrix} x_{1j} \\ x_{2j} \\ x_{3j} \\ x_{4j} \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix} \begin{pmatrix} y_{1j} \\ y_{2j} \\ y_{3j} \\ 1 \end{pmatrix} \quad (1)$$

$$\begin{pmatrix} x_{1j} \\ x_{2j} \\ x_{3j} \\ x_{4j} \end{pmatrix} = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \\ m_{41} & m_{42} & m_{43} & m_{44} & m_{45} \end{pmatrix} \begin{pmatrix} y_{1j} \\ y_{2j} \\ y_{3j} \\ x_{4j} \\ 1 \end{pmatrix} \quad (2)$$

Figure 5:
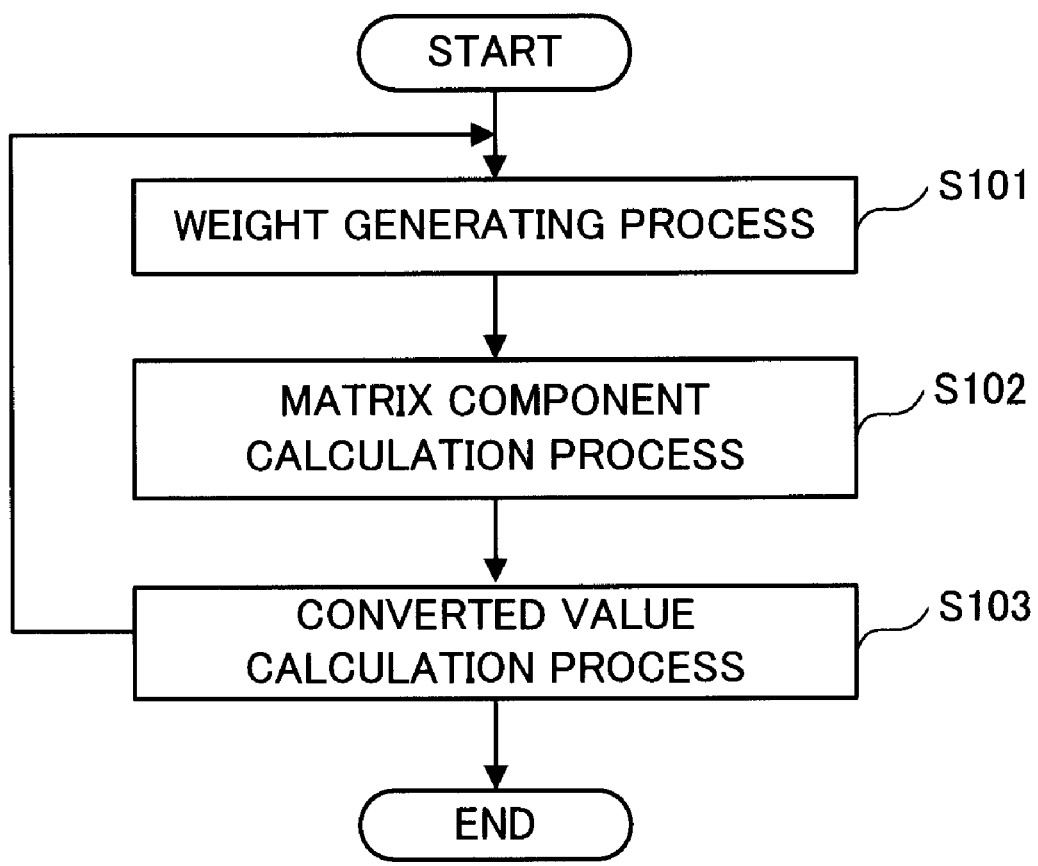
FIG. 5 is a flowchart showing one example of a processing procedure for generating the color conversion characteristic model in the first color conversion processor.

FIG. 5 is a flowchart showing one example of a processing procedure for generating the color conversion characteristic model in the first color conversion processor 50. As shown in FIG. 5, in generation processing of the color conversion characteristic model in the first color conversion processor 50, a weight generating process (step 101), a matrix component calculation process (step 102) and a converted value calculation process (step 103) are executed.

[Weight Generating Process]

In the first place, the first color conversion processor 50 performs the weight generating process (step 101) of generating weight $W_{ij}$ in the weight generating portion 53. The weight generating portion 53 acquires the in-gamut grid point datasets $(y_{1j}, y_{2j}, y_{3j})$ representing a conversion source color from the in-gamut/out-of-gamut determining part 40. In addition, the weight generating portion 53 acquires the actual datasets $(y_{1i}, y_{2i}, y_{3i})$ in the L*a*b* color space from the actual data pair storage 52, and normalizes the differences between pairs of signal components in the in-gamut grid point datasets $(y_{1j}, y_{2j}, y_{3j})$ and in the actual datasets $(y_{1i}, y_{2i}, y_{3i})$. Thereafter, the weight generating portion 53 generates first weight $W_{1ij}$ that monotonously decreases according to the Euclidean distance in the normalized signal composed of these normalized difference components. Specifically, the first weight $W_{1ij}$ is set as a first function $F_{ij}$ shown in the following equation (3).

In addition, the weight generating portion 53 calculates $(x_{4j})$ from the in-gamut grid point datasets $(y_{1j}, y_{2j}, y_{3j})$. Then, the weight generating portion 53 acquires the actual datasets $(x_{1i}, x_{2i}, x_{3i}, x_{4i})$ in the CMYK color space corresponding to the actual data sets $(y_{1i}, y_{2i}, y_{3i})$ in the L*a*b* color space from the actual data pair storage 52, and normalizes the differences between pairs of signal components of the calculated $(x_{4j})$ and of the actual data pieces $(x_{4i})$. Thereafter, the weight generating portion 53 generates second weight $W_{2ij}$ that monotonously decreases according to the Euclidean distance of the normalized signal composed of these normalized difference components. Specifically, the second weight $W_{2ij}$ is set as a second function $G_{ij}$ shown in the following equation (4).

Subsequently, the weight generating portion 53 generates the weight $W_{ij}$ in which the first weight $W_{1ij}$ and the second weight $W_{2ij}$ are combined with each other as shown in equation (5).

Note that, $y_{10}$, $y_{20}$ and $y_{30}$ in the equation (3) and $x_{40}$ in the equation (4) are normalization constants for defining the width of the first weight $W_{1ij}$ and the width of the second weight $W_{2ij}$ according to the Euclidean distance.

$$W_{1ij}=F_{ij}(((y_{1i}-y_{1j})/y_{10})^2+((y_{2i}-y_{2j})/y_{20})^2+((y_{3i}-y_{3j})/y_{30})^2) \quad (3)$$

$$W_{2ij}=G_{ij}(((x_{4i}-x_{4j})/x_{40})^2) \quad (4)$$

$$W_{ij}=H(W_{1ij},W_{2ij}) \quad (5)$$

In this way, in the weight generating process (step 101), the weight $W_{ij}$ is set by use of the first function $F_{ij}$ and the second function $G_{ij}$ that are the two functions monotonously decreasing according to the Euclidean distance between the two color datasets (color coordinates). With this setting, the weight $W_{ij}$ is set small for an actual dataset having a large difference in distance from each grid point dataset in the color space (color difference distance) to make the actual dataset less influential. On the other hand, the weight $W_{ij}$ is set large for an actual dataset having a small color difference in distance from the grid point dataset to deal with the actual dataset as an important dataset.

[Matrix Component Calculation Process]

In the matrix component calculation process (step 102) next to the weight generation process (step 101), the color conversion characteristic model calculating portion 54 performs processing of figuring out all the components $m_{11}, m_{12}, m_{13}, m_{14}, \ldots$ in the matrix in the equation (2).

The color conversion characteristic model calculating portion 54 acquires the in-gamut grid point datasets ($y_{1j}, y_{2j}, y_{3j}$) from the in-gamut/out-of-gamut determining part 40, and acquires the actual datasets ($x_{1i}, x_{2i}, x_{3i}, x_{4i}$) in the CMYK color space and the corresponding actual datasets ($y_{1i}, y_{2i}, y_{3i}$) in the L*a*b* color space, from the actual data pair storage 52. Moreover, the color conversion characteristic model calculating portion 54 acquires the weight $W_{ij}$ generated from the weight generating portion 53.

Then, the color conversion characteristic model calculating portion 54 figures out all the components $m_{11}, m_{12}, m_{13}, m_{14}, \ldots$ in the matrix in the equation (2) through the least squares method, which is one example of the linear regression analysis, under the condition of minimizing a sum of squares $E_j$ (shown by the following equation (7)). Precisely, the sum of squares $E_j$ is a value obtained by multiplying the weight $W_{ij}$ generated in the weight generation process (step 101) by the Euclidean distance between the output converted values ($x'_{1i}, x'_{2i}, x'_{3i}, x'_{4i}$) calculated by the following equation (6) and the actual datasets ($x_{1i}, x_{2i}, x_{3i}, x_{4i}$) in the CMYK color space. Here, the actual datasets ($x_{1i}, x_{2i}, x_{3i}, x_{4i}$) in the CMYK color space correspond to the actual datasets ($y_{1i}, y_{2i}, y_{3i}$) in the L*a*b* color space used to calculate the output converted value ($x'_{1i}, x'_{2i}, x'_{3i}, x'_{4i}$) based on the equation (6).

$$\begin{pmatrix} x'_{1j} \\ x'_{2j} \\ x'_{3j} \\ x'_{4j} \end{pmatrix} = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \\ m_{41} & m_{42} & m_{43} & m_{44} & m_{45} \end{pmatrix} \begin{pmatrix} y_{1j} \\ y_{2j} \\ y_{3j} \\ x_{4j} \\ 1 \end{pmatrix} \quad (6)$$

$$E_j = \sum_{i=0}^{n} (W_{ij}^2((x'_{1i}-x_{1i})^2 + (x'_{2i}-x_{2i})^2 + (x'_{3i}-x_{3i})^2 + (x'_{4i}-x_{4i})^2)) \quad (7)$$

[Converted Value Calculation Process]

In a converted value calculation process (step 103) subsequent to the matrix component calculation process (step 102), the converted color datasets ($x_{1j}, x_{2j}, x_{3j}$) are calculated from the in-gamut grid point datasets ($y_{1j}, y_{2j}, y_{3j}$) each representing a conversion source color, and ($x_{4j}$) calculated from the grid point datasets ($y_{1j}, y_{2j}, y_{3j}$). The calculation of the converted color datasets ($x_{1j}, x_{2j}, x_{3j}$) is based on the equation (2) assigned all the matrix components $m_{11}, m_{12}, m_{13}, m_{14}, \ldots$ that have been figured out in the matrix component calculation process (step 102).

Further, the color conversion characteristic model calculating portion 54 transmits the calculated converted color datasets ($x_{1j}, x_{2j}, x_{3j}$) to the weight generating portion 53. The weight generating portion 53 adjusts the normalization constants $y_{10}, y_{20}, y_{30}, x_{40}$ in reference to the converted color datasets ($x_{1j}, x_{2j}, x_{3j}$) calculated by the color conversion characteristic model calculating portion 54, and recalculates the weight $W_{ij}$. Then, by using the recalculated weight $W_{ij}$, the color conversion characteristic model calculating portion 54 obtains a matrix composed of the matrix components $m_{11}, m_{12}, m_{13}, m_{14}, \ldots$ that minimize $E_j$ in the equation (7). In addition, by using the matrix components $m_{11}, m_{12}, m_{13}, m_{14}, \ldots$, the color conversion characteristic model calculating portion 54 recalculates the converted color datasets ($x_{1j}, x_{2j}, x_{3j}$). The color conversion characteristic model calculating portion 54 obtains a highly-accurate matrix by converging the converted color datasets ($x_{1j}, x_{2j}, x_{3j}$) through the iterative execution of the processing from the weight generation process at step 101 to the converted value calculation process at step 103.

Thereafter, the color conversion characteristic model calculating portion 54 sets the obtained matrix in the equation (2) composed of the matrix components $m_{11}, m_{12}, m_{13}, m_{14}, \ldots$, as the color conversion characteristic model in the color converting portion 55. Based on the equation (2) with the set matrix, the color converting portion 55 calculates the converted color datasets ($x_{1j}, x_{2j}, x_{3j}, x_{4j}$) from the in-gamut grid point datasets ($y_{1j}, y_{2j}, y_{3j}$) acquired from the in-gamut/out-of-gamut determining part 40. Here, the converted color datasets ($x_{1j}, x_{2j}, x_{3j}, x_{4j}$) are color datasets in the output color space of the target device.

The color converting portion 55 transmits the calculated converted color datasets ($x_{1j}, x_{2j}, x_{3j}, x_{4j}$) to the in-gamut converted color data output part 60 while associating the converted color datasets ($x_{1j}, x_{2j}, x_{3j}, x_{4j}$) with the in-gamut grid point datasets ($y_{1j}, y_{2j}, y_{3j}$). Then, the in-gamut converted color data output part 60 transmits the converted color datasets ($x_{1j}, x_{2j}, x_{3j}, x_{4j}$) associated with the in-gamut grid point datasets ($y_{1j}, y_{2j}, y_{3j}$) to the second color conversion processor 70 and the converted color data output part 90.

Note that the first color conversion processor 50 of the present exemplary embodiment may use, as the method of generating the color conversion characteristic model, the aforementioned statistical processing method of performing the linear regression analysis using the weighted actual datasets, as well as another statistical processing method using a neural network that has learned from the weighed actual datasets or an equivalent method.

Hereinafter, the second color conversion processor 70 will be described. The second color conversion processor 70 is one example of a second color conversion processor, and performs color conversion processing on grid point datasets that are determined as existing out of the gamut and are acquired from the in-gamut/out-of-gamut determining part 40. This color conversion processing of the second color conversion processor 70 is based on the in-gamut grid point datasets $(y_{1j}, y_{2j}, y_{3j})$ and their corresponding converted color datasets $(x_{1j}, x_{2j}, x_{3j}, x_{4j})$ generated by the first color conversion processor 50, and the pairs of the in-gamut grid point datasets and the converted color datasets are one example of color conversion correspondence.

Figure 6:
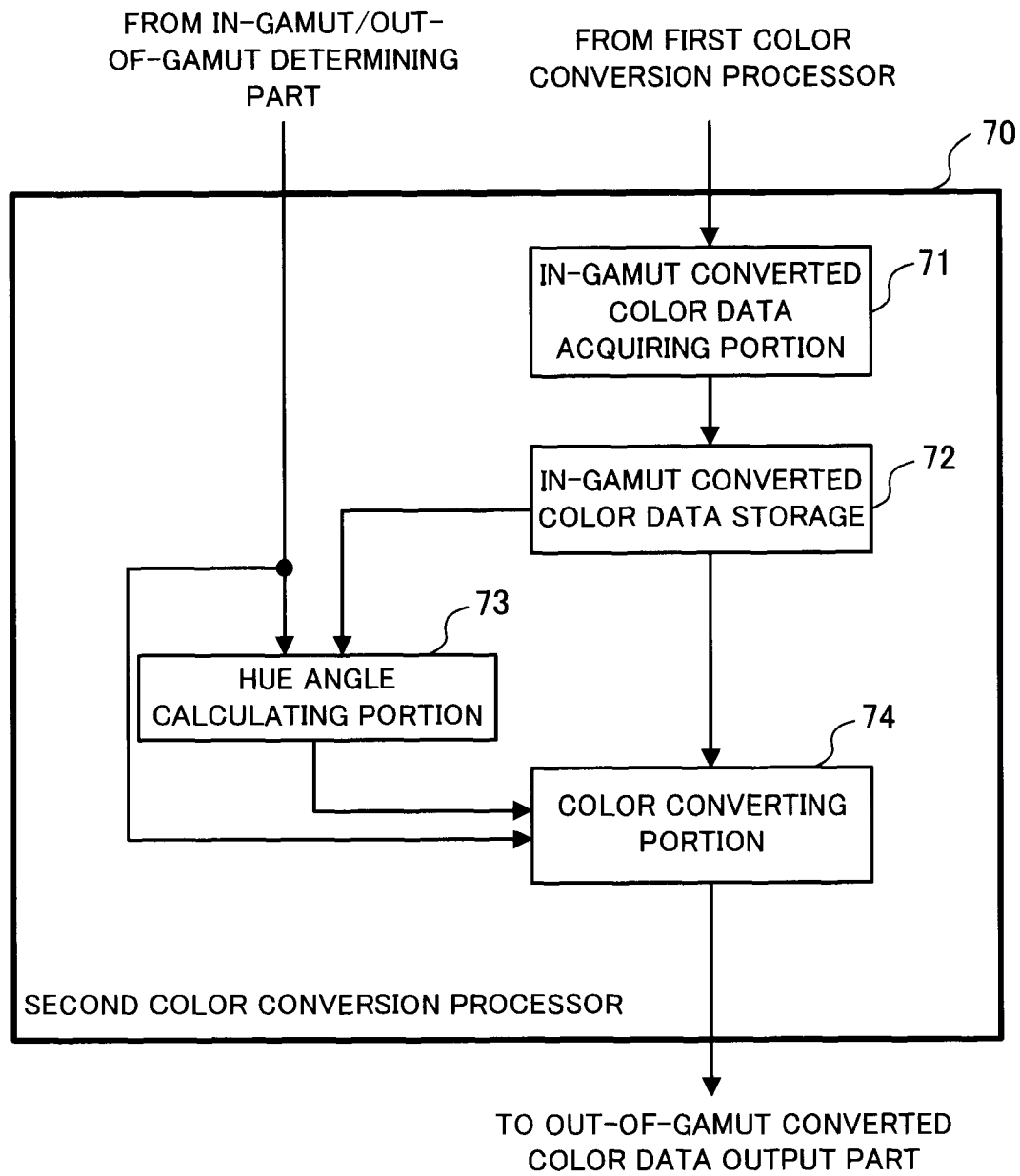
FIG. 6 is a block diagram showing a functional configuration of the second color conversion processor.

FIG. 6 is a block diagram showing a functional configuration of the second color conversion processor 70. The second color conversion processor 70 is provided with an in-gamut converted color data acquiring portion 71, an in-gamut converted color data storage 72, a hue angle calculating portion 73 and a color converting portion 74.

The in-gamut converted color data acquiring portion 71 acquires the converted color datasets $(x_{1j}, x_{2j}, x_{3j}, x_{4j})$ associated with the in-gamut grid point datasets $(y_{1j}, y_{2j}, y_{3j})$ from the in-gamut converted color data output part 60. The in-gamut converted color data storage 72 stores, as pairs, the in-gamut grid point datasets $(y_{1j}, y_{2j}, y_{3j})$ acquired by the in-gamut converted color data acquiring portion 71, and the converted color datasets $(x_{1j}, x_{2j}, x_{3j}, x_{4j})$ associated with the in-gamut grid point datasets $(y_{1j}, y_{2j}, y_{3j})$.

The hue angle calculating portion 73 acquires a grid point dataset $(y_{1q}, y_{2q}, y_{3q})$ determined as existing out of the gamut, from the in-gamut/out-of-gamut determining part 40. To deal with an angle (hue angle), here, consider a particular plane in the L*a*b* color space, i.e., the a*b* plane with the lightness axis (L* axis) set at the origin. The hue angle calculating portion 73 calculates an angle (hue angle) between any of the chromaticity axes (for example, the a* axis) and a line connecting the origin and the coordinate point (grid point) Q of the out-of gamut grid point dataset $(y_{1q}, y_{2q}, y_{3q})$ in the a*b* plane.

Moreover, the hue angle calculating portion 73 acquires the in-gamut grid point datasets $(y_{1j}, y_{2j}, y_{3j})$ from the in-gamut converted color data storage 72. Further, from the acquired in-gamut grid point datasets $(y_{1j}, y_{2j}, y_{3j})$, the hue angle calculating portion 73 extracts the in-gamut grid point datasets $(y_{1j}, y_{2j}, y_{3j})$ existing inside the same a*b* plane as the out-of-gamut grid point Q $(y_{1q}, y_{2q}, y_{3q})$ acquired from the in-gamut/out-of-gamut determining part 40. More specifically, the in-gamut grid point datasets thus extracted are datasets $(y_{1j}(=y_{1q}), y_{2j}, y_{3j})$ having the same lightness (L*=$y_{1q}$) as the grid point Q $(y_{1q}, y_{2q}, y_{3q})$ acquired from the in-gamut/out-of-gamut determining part 40. Furthermore, from the extracted in-gamut grid point datasets $(y_{1q}, y_{2j}, y_{3j})$ in the same plane in the lightness, the hue angle calculating portion 73 extracts the grid point datasets $(y_{1q}, y_{2j}, y_{3j})$ adjacent to the outer boundary of the gamut in this plane.

Thereafter, the hue angle calculating portion 73 calculates a hue angle with respect to each of the coordinate points (grid points) of the grid point datasets $(y_{1q}, y_{2j}, y_{3j})$ adjacent to the outer boundary of the gamut in the same a*b* plane.

Moreover, the hue angle calculating portion 73 selects two in-gamut grid points from the grid points $(y_{1q}, y_{2j}, y_{3j})$ adjacent to the outer boundary of the gamut in the same a*b* plane as the out-of-gamut grid point Q $(y_{1q}, y_{2q}, y_{3q})$. The selected two points are the in-gamut grid point having a hue angle next larger than the out-of-gamut grid point Q $(y_{1q}, y_{2q}, y_{3q})$ has, and the in-gamut grid point having a hue angle next smaller than the out-of-gamut grid point Q $(y_{1q}, y_{2q}, y_{3q})$ has.

Subsequently, to the color converting portion 74, the hue angle calculating portion 73 outputs information on the selected two in-gamut grid points and their hue angles, and information on the out-of-gamut grid point Q $(y_{1q}, y_{2q}, y_{3q})$ and its hue angle.

Figure 7:
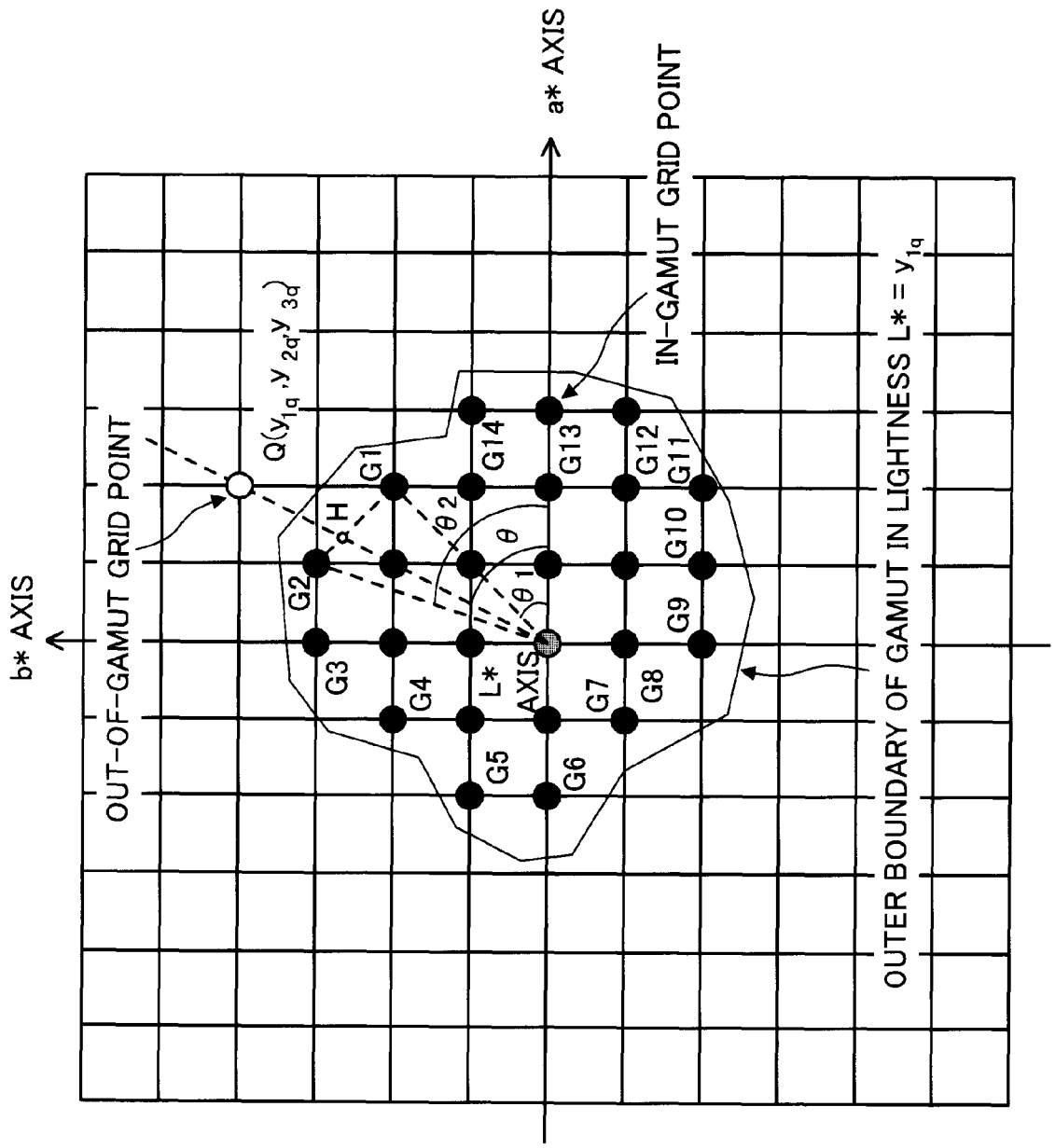
FIG. 7 is a diagram for explaining the two in-gamut grid points and their hue angles outputted from the hue angle calculating portion.

Here, FIG. 7 is a diagram for explaining the two in-gamut grid points and their hue angles outputted from the hue angle calculating portion 73. FIG. 7 shows a plane (a*b* plane) in the L*a*b* color space, which has the same L* value as the out-of-gamut grid point Q $(y_{1q}, y_{2q}, y_{3q})$.

As shown in FIG. 7, the hue angle calculating portion 73 firstly calculates the hue angle θ with respect to the out-of-gamut grid point Q $(y_{1q}, y_{2q}, y_{3q})$ acquired from the in-gamut/out-of-gamut determining part 40. Then, from the in-gamut grid point datasets $(y_{1j}, y_{2j}, y_{3j})$ acquired from the in-gamut converted color data storage 72, the hue angle calculating portion 73 extracts the in-gamut grid points $(y_{1q}, y_{2j}, y_{3j})$ existing inside the plane of the same lightness (L*=$y_{1q}$) as that of the out-of-gamut grid point Q $(Y_{1q}, y_{2q}, y_{3q})$. After that, the grid points G1, G2, . . . , G14 adjacent to the outer boundary of the gamut in this plane (L*=$y_{1q}$) are extracted from the extracted in-gamut grid points. Then, the hue angle calculating portion 73 calculates hue angles θ1, θ2, . . . , θ14 with respect to the grid points G1, G2, . . . , G14, respectively.

Next, the hue angle calculating portion 73 selects the grid point G2 having the hue angle θ2 next larger than the hue angle θ of the out-of-gamut grid point Q $(y_{1q}, y_{2q}, y_{3q})$, from the grid points G1, G2, . . . , G14 having the calculated hue angles θ1, θ2, . . . , θ14. The hue angle calculating portion 73 also selects the grid point G1 having the hue angle θ1 next smaller than the hue angle θ of the out-of-gamut grid point Q $(y_{1q}, y_{2q}, y_{3q})$. Then, the information on the selected two in-gamut grid points G1 and G2 and their hue angles θ1 and θ2, and information on the out-of-gamut grid point Q $(y_{1q}, y_{2q}, y_{3q})$ and its hue angle θ are outputted to the color converting portion 74.

From the hue angle calculating portion 73, the color converting portion 74 acquires the information on the selected two in-gamut grid points G1 and G2 and their hue angles θ1 and θ2, and information on the out-of-gamut grid point Q $(y_{1q}, y_{2q}, y_{3q})$ and its hue angle θ. In addition, from the in-gamut converted color data storage 72, the color converting portion 74 acquires the converted color datasets $(x_{1j}, x_{2j}, x_{3j}, x_{4j})$ calculated by the first color conversion processor 50 and corresponding to the acquired two in-gamut grid points G1 and G2.

Then, the color converting portion 74 calculates the converted color dataset $(x_{1q}, x_{2q}, x_{3q}, x_{4q})$ for the out-of-gamut grid point Q $(y_{1q}, y_{2q}, y_{3q})$, on the basis of the converted color datasets $(x_{1j}, x_{2j}, x_{3j}, x_{4j})$ of the two grid points G1 and G2. To be more precise, an interpolation operation is performed by using the hue angles θ1 and θ2 of the grid points G1 and G2 and the hue angle θ of the grid point Q to internally divide a segment connecting the two converted color datasets $(x_{1j}, x_{2j}, x_{3j}, x_{4j})$ for the two grid points G1 and G2. Thus, the color converting portion 74 calculates the converted color dataset $(x_{1q}, x_{2q}, x_{3q}, x_{4q})$, which is a color dataset in the output color space of the target device, with respect to the out-of-gamut grid point Q.

More precisely, the color converting portion 74 calculates the difference (θ2−θ) between the hue angle θ2 of the grid point G2 and the hue angle θ of the grid point Q, and the difference (θ−θ1) between the hue angle θ1 of the grid point G1 and the hue angle θ of the grid point Q. Then, the color converting portion 74 internally divides the segment connecting the two converted color datasets $(x_{1j}, x_{2j}, x_{3j}, x_{4j})$ for the grid points G1 and G2 by using the difference (θ2−θ) and the difference (θ1−θ). Specifically, the converted color dataset q $(x_{1q}, x_{2q}, x_{3q}, x_{4q})$ for the grid point Q is calculated through the following equation (8):

$$q = \frac{(\theta 2 - \theta)X1 + (\theta - \theta 1)X2}{\theta 2 - \theta 1} \quad (8)$$

where X1 and X2 denote the converted color datasets for the grid points G1 and G2, respectively.

The converted color dataset q $(x_{1q}, x_{2q}, x_{3q}, x_{4q})$ calculated with the equation (8) is equivalent to the converted color dataset of a coordinate point H that internally divides the segment connecting the grid points G1 and G2 in the ratio of (θ2−θ):(θ−θ1). Accordingly, the converted color dataset $(x_{1q}, x_{2q}, x_{3q}, x_{4q})$ for the out-of-gamut grid point Q $(y_{1q}, y_{2q}, y_{3q})$ is a converted color dataset related to a grid point out of the gamut, but the in-gamut converted color datasets close to the out-of-gamut grid point Q is reflected therein. Moreover, use of the in-gamut converted color datasets existing on the plane of the same lightness $(L^*=y_{1q})$ as the out-of-gamut grid point Q $(y_{1q}, y_{2q}, y_{3q})$ allows the converted color dataset $(x_{1q}, x_{2q}, x_{3q}, x_{4q})$ to keep the same color information on the lightness, and to have the same hue angle as the out-of-gamut grid point Q $(y_{1q}, y_{2q}, y_{3q})$. This suppresses the deterioration of the color reproducibility even for the out-of-gamut grid point Q $(y_{1q}, y_{2q}, y_{3q})$.

Moreover, the second color conversion processor 70 calculates the converted color dataset $(x_{1q}, x_{2q}, x_{3q}, x_{4q})$ of the out-of-gamut grid point Q $(y_{1q}, y_{2q}, y_{3q})$ through the arithmetic operation such as, for example, the interpolation operation using the converted color datasets $(x_{1j}, x_{2j}, x_{3j}, x_{4j})$ calculated by the first color conversion processor 50. For this reason, the second color conversion processor 70 is capable of calculating the converted color dataset $(x_{1q}, x_{2q}, x_{3q}, x_{4q})$ for a shorter time than in the case where the converted color dataset $(x_{1q}, x_{2q}, x_{3q}, x_{4q})$ for the out-of-gamut grid point Q $(y_{1q}, y_{2q}, y_{3q})$ is calculated by use of the color conversion characteristic model like the first color conversion processor 50, by use of the gamut compression processing (Gamut Mapping Algorithm), or by use of other similar techniques.

Then, the color converting portion 74 transmits the calculated converted color dataset $(x_{1q}, x_{2q}, x_{3q}, x_{4q})$ to the out-of-gamut converted color data output part 80 in association with the out-of-gamut grid point data $(y_{1q}, y_{2q}, y_{3q})$. Thereafter, the out-of-gamut converted color data output part 80 transmits the converted color dataset $(x_{1q}, x_{2q}, x_{3q}, x_{4q})$ associated with the out-of-gamut grid point dataset $(y_{1q}, y_{2q}, y_{3q})$ to the converted color data output part 90.

The converted color data output part 90 acquires the converted color datasets $(x_{1j}, x_{2j}, x_{3j}, x_{4j})$ associated with the in-gamut grid point datasets $(y_{1j}, y_{2j}, y_{3j})$ from the in-gamut converted color data output part 60, and also acquires the converted color datasets $(x_{1q}, x_{2q}, x_{3q}, x_{4q})$ associated with the out-of-gamut grid point datasets $(y_{1q}, y_{2q}, y_{3q})$ from the out-of-gamut converted color data output part 80. Then, the converted color data output part 90 outputs a data group composed of a pair of each of the in-gamut and out-of-gamut grid point datasets, and its corresponding one of the converted color datasets, which are respectively obtained from the grid point datasets through the color-conversion processing. This data group is used in a color conversion table called a direct look-up table (DLUT) to be used when a color image forming apparatus such as a color printer, for example, or another similar apparatus performs color conversion processing on image data inputted from an external device such as a personal computer (PC).

Figure 8:
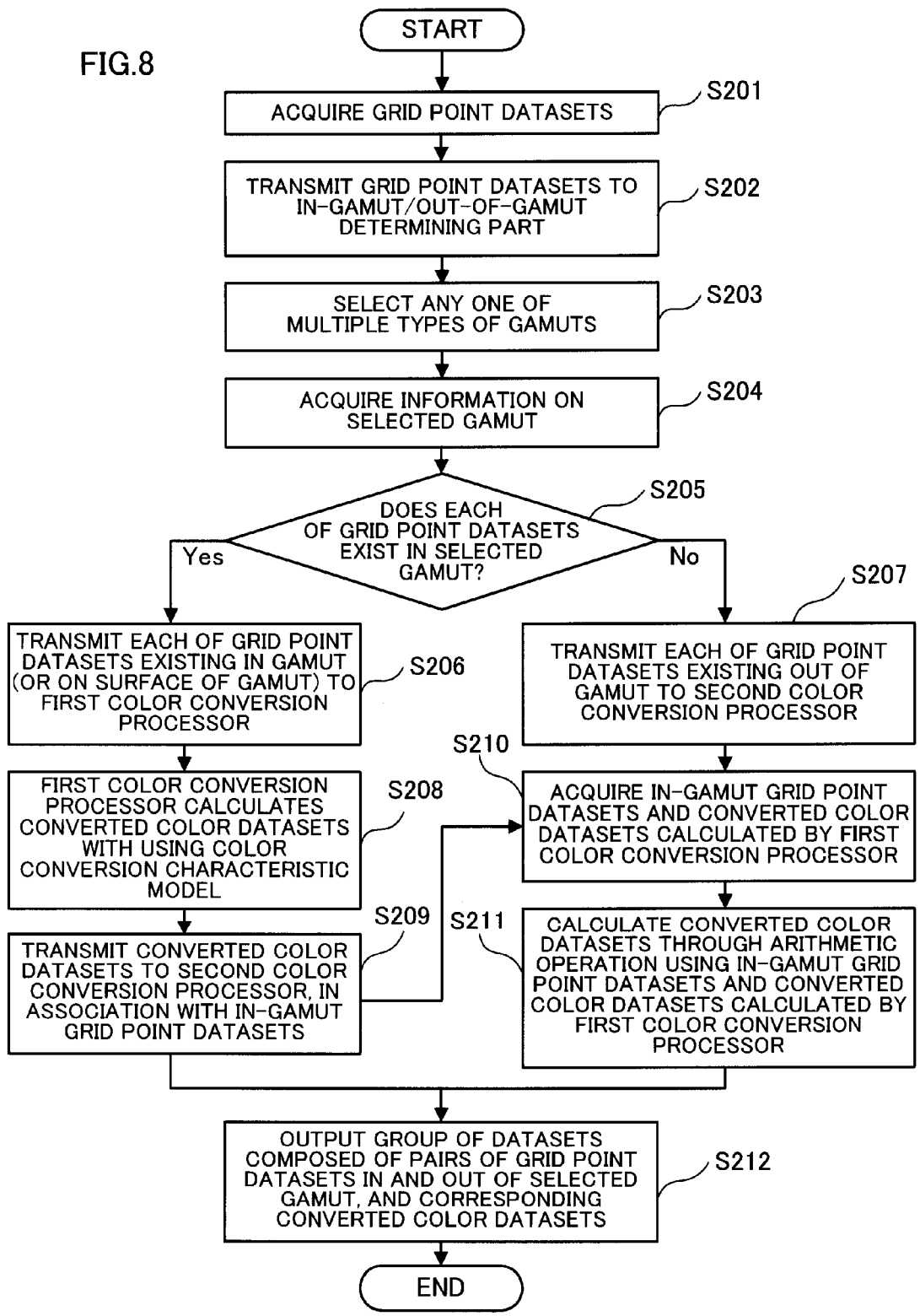
FIG. 8 is a flowchart showing one example of a color conversion processing procedure performed by the color processor.

Here, FIG. 8 is a flowchart showing one example of a color conversion processing procedure performed by the color processor 1. As shown in FIG. 8, in the color processor 1, the grid point data acquiring part 10 acquires grid point datasets (step 201), and then transmits the acquired grid point datasets to the in-gamut/out-of-gamut determining part 40 (step 202). Meanwhile, the gamut selecting part 30 selects any one of the multiple types of gamuts stored in the gamut storage 20 (step 203). The in-gamut/out-of-gamut determining part 40 acquires the information (gamut information) on the gamut that is selected by the gamut selecting part 30 from the multiple gamuts stored in the gamut storage 20 (step 204).

Subsequently, the in-gamut/out-of-gamut determining part 40 compares the acquired grid point datasets with gamut information, and determines whether each of the acquired grid point datasets exists in the selected gamut (or on the surface of the gamut boundary polygon) or out of the gamut (step 205). The in-gamut/out-of-gamut determining part 40 transmits each of the grid point datasets determined as existing in the selected gamut (or on the surface of the gamut), to the first color conversion processor 50 (step 206). On the other hand, the in-gamut/out-of-gamut determining part 40 transmits each of the grid point datasets determined as existing out of the selected gamut, to the second color conversion processor 70 (step 207).

The first color conversion processor 50 having acquired the in-gamut grid point datasets performs the color conversion processing on the in-gamut grid point datasets with using the color conversion characteristic model to calculate the converted color datasets (step 208). Then, the first color conversion processor 50 transmits the calculated converted color datasets to the second color conversion processor 70, respectively in association with the in-gamut grid point datasets (step 209).

The second color conversion processor 70 acquires the in-gamut grid point datasets and the converted color datasets calculated by the first color conversion processor 50 (step 210). Thereafter, the second color conversion processor 70 calculates a converted color dataset for each of the out-of-gamut grid point datasets through the arithmetic operation such as, for example, the interpolation operation, using the in-gamut grid point datasets and the converted color datasets calculated by the first color conversion processor 50 (step 211).

Then, the converted color data output part 90 outputs a group of datasets composed of pairs of grid point datasets in and out of the gamut selected by the gamut selecting part 30, and the corresponding converted color datasets obtained through the color conversion processing (step 212). In this way, the color processor 1 performs the color conversion processing on the grid point datasets in and out of the gamut selected by the gamut selecting part 30.

Figure 9:
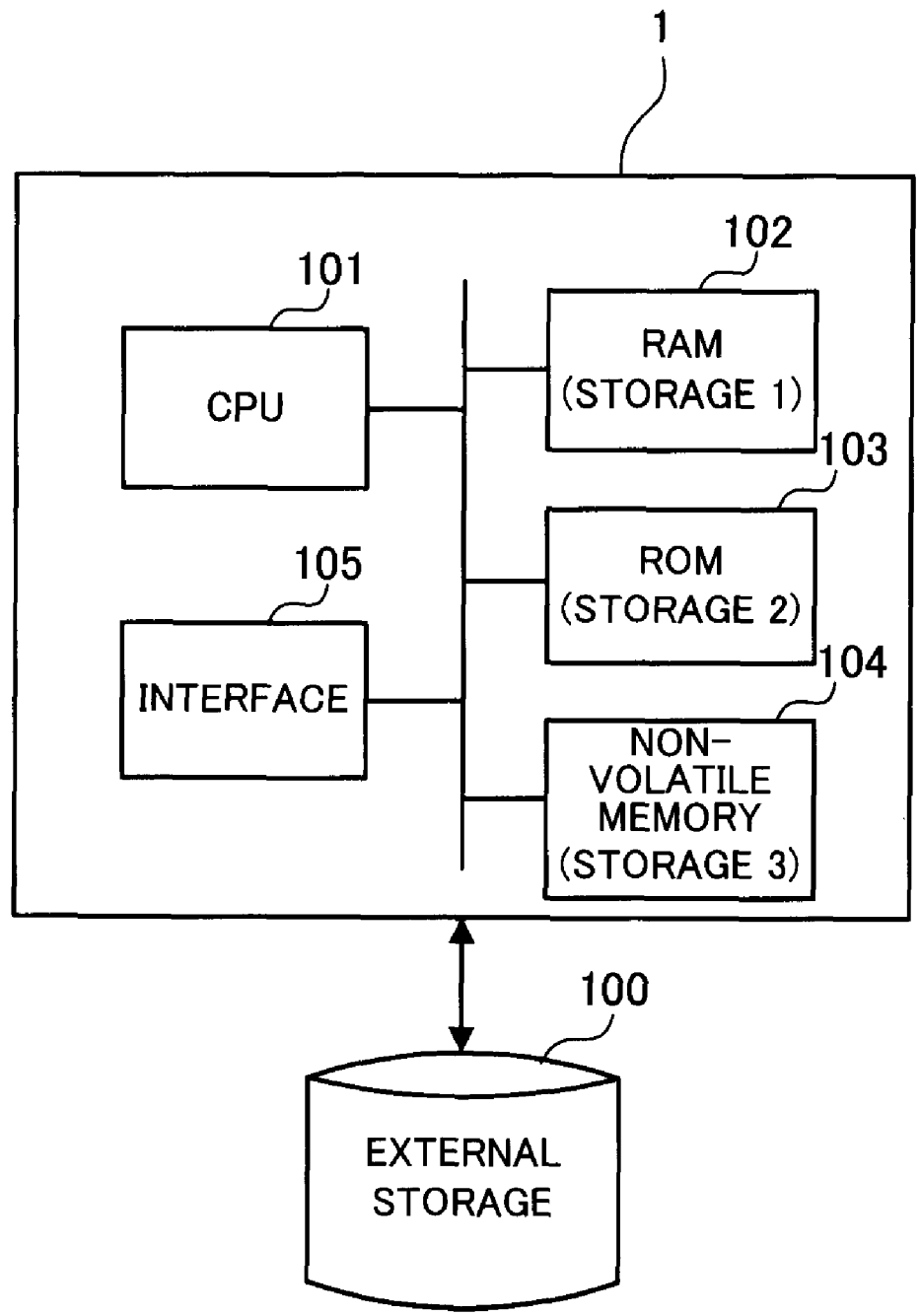
FIG. 9 is a diagram showing a hardware configuration of the color processor of the exemplary embodiment.

Next, FIG. 9 is a diagram showing a hardware configuration of the color processor 1 of the exemplary embodiment. As shown in FIG. 9, the color processor 1 is provided with a CPU 101 as one example of an arithmetic unit that executes digital arithmetic operation according to a processing program set in advance for execution of the color conversion processing, a RAM 102 in which a processing program and the like executed by the CPU 101 are stored, a ROM 103 in which data such as a setting value and the like used for the processing program or the like executed by the CPU 101 are stored, a non-volatile memory 104 such as an EEPROM or a flash memory that is rewritable and capable of holding data even when the electric power supply is terminated, and an interface 105 that controls signal input from and signal output to the respective parts connected to the color processor 1.

Further, to the color processor 1, an external storage 100 is connected. In the external storage 100, a processing program executed by the color processor 1 is stored. The color processor 1 reads out the processing program, whereby the color conversion processing is executed in the color processor 1 of the present exemplary embodiment.

It should be noted that the "storage" here includes devices such as a hard disk drive and a memory.

In other words, a program for realizing the respective functions of the above-described grid point data acquiring part 10, gamut selecting part 30, in-gamut/out-of-gamut determining part 40, first color conversion processor 50, in-gamut converted color data output part 60, second color conversion processor 70, out-of-gamut converted color data output part 80 and converted color data output part 90 is read out from the external storage 100 to be loaded into the RAM 102 in the color processor 1. Then, the CPU 101 executes various kinds of processings on the basis of the processing program loaded into the RAM 102. The processing program may be provided, for example, by loading, into a RAM 102, the processing program stored in a hard disk, a DVD-ROM or the like as an example of an external storage 100. In addition, as another aspect of providing the processing program, the processing program may be stored in a ROM 103 in advance, and is loaded from the ROM 103 into the RAM 102. Moreover, when a rewritable ROM 103 such as an EEPROM is provided, the processing program may be provided to the ROM 103 and is loaded into the RAM 102 from the ROM 103 after the assembling of the color processor 1 is completed. In addition, the processing program may be transmitted to the color processor 1 through a network such as the Internet and then installed in the RAM 102 in the color processor 1.

As has been described above, the color processor 1 of the present exemplary embodiment performs the color conversion processing on each of color datasets (grid point datasets) in a gamut selected by the gamut selecting part 30 by use of a color conversion characteristic model in which the converted color datasets with high accuracy is obtained in color conversion. On the other hand, the color processor 1 of the present exemplary embodiment performs the color conversion processing on each of color datasets (grid point datasets) out of the gamut selected by the gamut selecting part 30, through the arithmetic operation which is executed at a high speed, such as, for example, the interpolation operation by using the in-gamut converted color datasets.

Hence, the color conversion processing for color datasets in a color space is performed in a way that an important region in the color space in terms of the color conversion processing is color-converted with the high color conversion accuracy maintained whereas a relatively less important region is color-converted through the color conversion processing designed to achieve higher speed operations. In this way, the entire color conversion processing is designed to be speeded up. Moreover, since the gamut selecting part 30 selects the important region for the color conversion processing, a region needing to maintain the high color conversion accuracy and a region suited to the high-speed arithmetic operations for the color conversion processing are freely set.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processor comprising:
a conversion source color data acquiring part for acquiring conversion source color datasets in a first color space;
a gamut storage for storing a gamut;
a determining part for determining whether or not each of the conversion source color datasets acquired by the conversion source color data acquiring part exists in the gamut stored in the gamut storage;
a first color conversion processor for performing color conversion processing on each of conversion source color datasets A included in the conversion source color datasets by use of a color conversion characteristic model that defines correspondence between colors in the first color space and colors in a second color space which is a destination for the color conversion processing, the conversion source color datasets A being determined to exist in the gamut by the determining part; and
a second color conversion processor for performing color conversion processing on each of conversion source color datasets B included in the conversion source color datasets by use of color conversion correspondence that is obtained by performing the color conversion processing on the conversion source color datasets A by the first color conversion processor, the conversion source color datasets B being determined not to exist in the gamut by the determining part, the second color conversion processor including a hue angle calculating portion for extracting datasets from the conversion source color datasets A that have a same lightness as the conversion source color datasets B, and calculating a hue angle with respect to each of the conversion source color datasets B and the extracted conversion source color datasets A.

2. The color processor according to claim 1, wherein the second color conversion processor performs the color conversion processing on the conversion source color datasets B through an interpolation operation using the color conversion correspondence obtained by the first color conversion processor.

3. The color processor according to claim 2, wherein
the conversion source color data acquiring part acquires the conversion source color datasets in a L*a*b* color space, as the conversion source color datasets, and
the second color conversion processor performs the color conversion processing on each of the conversion source color datasets B through an interpolation operation using the color conversion correspondence with respect to some of the conversion source color datasets A located in the gamut and having a lightness component same as a lightness component of each of the conversion source color datasets B, the color conversion correspondence being obtained by the first color conversion processor.

4. The color processor according to claim 3, wherein the second color conversion processor calculates a hue angle of each of the conversion source color datasets B, and hue angles of some of the conversion source datasets A located in the gamut, each having a lightness component same as a lightness component of each of the conversion source color datasets B and being adjacent to a boundary of the gamut, and performs the interpolation operation on the basis of the hue angle of each of the conversion source color datasets B and the hue angles of the some of the conversion source color datasets A located in the gamut.

5. The color processor according to claim 1, wherein the gamut storage is a storage in which a plurality of gamuts are stored, the plurality of gamuts including a gamut of an apparatus that uses color converted datasets obtained by performing color conversion processing on the conversion source color datasets acquired by the conversion source color data acquiring part and at least one of gamuts covers the gamut,
the color processor further comprises a gamut selecting part for selecting one gamut from the plurality of gamuts stored in the gamut storage; and
the determination part determines whether or not each of the conversion source color datasets exists in the one gamut selected by the gamut selecting part.

6. A computer readable medium storing a program causing a computer to execute a process for performing color conversion processing, the process comprising:
acquiring conversion source color datasets in a first color space;
determining whether or not each of the conversion source color datasets exists in a gamut;
performing color conversion processing on each of conversion source color datasets A included in the conversion source color datasets by use of a color conversion characteristic model that defines correspondence between colors in the first color space and colors in a second color space which is a destination for the color conversion processing, the conversion source color datasets A being determined to exist in the gamut;
performing color conversion processing on each of conversion source color datasets B included in the conversion source color datasets by use of color conversion correspondence that is obtained by performing the color conversion processing on the conversion source color datasets A by use of the color conversion characteristic model, the conversion source color datasets B being determined not to exist in the gamut;
extracting datasets from the conversion source color datasets A that have a same lightness as the conversion source color datasets B; and
calculating a hue angle with respect to each of the conversion source color datasets B and the extracted conversion source datasets A.

7. The computer readable medium according to claim 6, wherein the color conversion processing is performed on the conversion source color datasets B through an interpolation operation using the color conversion correspondence obtained by performing the color conversion processing by use of the color conversion characteristic model.

8. The computer readable medium according to claim 7, wherein
the conversion source color datasets in a L*a*b* color space is acquired as the conversion source color datasets, and
the color conversion processing is performed on each of the conversion source color datasets B through an interpolation operation using the color conversion correspondence with respect to some of the conversion source color data sets A having a lightness component same as a lightness component of each of the conversion source color datasets B, the color conversion correspondence being obtained by use of the color conversion characteristic model.

9. The computer readable medium according to claim 8, wherein a hue angle of each of the conversion source color datasets B and hue angles of some of the conversion source datasets A having a lightness component same as a lightness component of each of the conversion source color datasets B and being adjacent to a boundary of the gamut are calculated, the interpolation operation is performed on the basis of the hue angle of each of the conversion source color datasets B and the hue angles of the some of the conversion source color datasets A.

10. The computer readable medium according to claim 6, further comprising:
selecting one gamut from a plurality of gamuts including a gamut of an apparatus that uses color converted datasets obtained by performing color conversion processing on the conversion source color datasets and at least one of gamuts that covers the gamut; and
determining whether or not each of the conversion source color datasets exists in the selected gamut.

11. A color processing method comprising:
acquiring conversion source color datasets in a first color space;
determining whether or not each of the conversion source color datasets exists in a gamut;
performing color conversion processing on each of conversion source color datasets A included in the conversion source color datasets by use of a color conversion characteristic model that defines correspondence between colors in the first color space and colors in a second color space which is a destination for the color conversion processing, the conversion source color datasets A being determined to exist in the gamut;
performing color conversion processing on each of conversion source color datasets B included in the conversion source color datasets by use of color conversion correspondence that is obtained by performing the color conversion processing on the conversion source color datasets A by use of the color conversion characteristic model, the conversion source color datasets B being determined not to exist in the gamut;
extracting datasets from the conversion source color datasets A that have a same lightness as the conversion source color datasets B; and
calculating a hue angle with respect to each of the conversion source color datasets B and the extracted conversion source datasets A.

* * * * *